United States Patent [19]

Kaganowicz

[11] Patent Number: 5,011,268
[45] Date of Patent: Apr. 30, 1991

[54] INORGANIC ALIGNMENT LAYER FOR LIQUID CRYSTAL DEVICES AND METHOD OF FORMING

[75] Inventor: Grzegorz Kaganowicz, Belle Mead, N.J.

[73] Assignee: General Electric Company, Princeton, N.J.

[21] Appl. No.: 428,698

[22] Filed: Oct. 30, 1989

[51] Int. Cl.$^5$ ............................................. G02F 1/133
[52] U.S. Cl. ................................. 350/341; 427/39; 204/192.12; 204/192.14
[58] Field of Search ............... 350/340, 341, 350 S; 357/2, 4, 23.7; 427/39, 40, 41, 166, 167; 204/192.12, 192.14, 192.15, 192.22, 192.23

[56] References Cited

U.S. PATENT DOCUMENTS

| | | | |
|---|---|---|---|
| 4,146,656 | 3/1979 | Kinugawa et al. | 427/109 |
| 4,402,999 | 9/1983 | Tatsumichi et al. | 427/126.3 |
| 4,405,208 | 9/1983 | Shirai | 350/341 |
| 4,437,731 | 3/1984 | Sudo et al. | 350/340 |
| 4,547,789 | 10/1985 | Cannella et al. | 359/23.7 |
| 4,634,228 | 1/1987 | Iwasaki et al. | 350/341 |
| 4,643,531 | 2/1987 | Inoue | 350/341 |
| 4,674,842 | 6/1987 | Van de Venne | 350/340 |
| 4,680,085 | 7/1987 | Vijan et al. | 357/4 |
| 4,705,359 | 11/1987 | Amstutz et al. | 350/341 |
| 4,723,839 | 2/1988 | Nakanowatari et al. | 350/341 |
| 4,812,018 | 3/1989 | Kobayashi | 350/341 |

FOREIGN PATENT DOCUMENTS 0098631 8/1979 Japan ...................... 350/340

*Primary Examiner*—Rolf Hille
*Assistant Examiner*—Tan Ho
*Attorney, Agent, or Firm*—J. S. Tripoli; D. H. Irlbeck; L. L. Hallacher

[57] ABSTRACT

An alignment layer for a liquid crystal display device which provides optimum molecular alignment, tilt angle and resistivity is formed by depositing, using glow discharge, an inorganic silicon based material onto the electrodes of the liquid crystal cell.

6 Claims, 1 Drawing Sheet

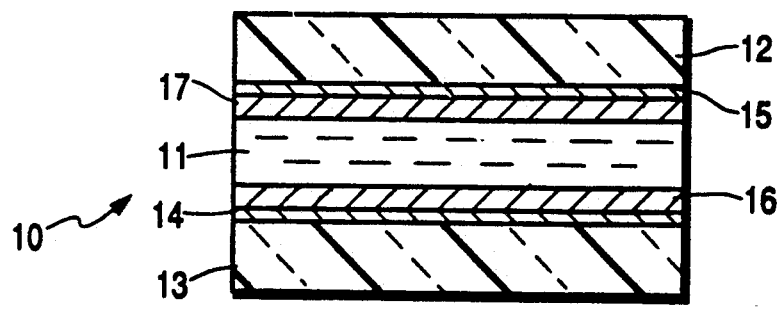

INORGANIC ALIGNMENT LAYER FOR LIQUID CRYSTAL DEVICES AND METHOD OF FORMING

BACKGROUND

This invention relates generally to liquid crystal devices and particularly to an inorganic alignment layer for such devices, and to a method of forming such layers.

Display devices which utilize twisted nematic liquid crystals include a liquid crystal material disposed between two insulative substrates, at least one of which is transparent. Electrical control electrodes are disposed on the surfaces of the substrates which face the liquid crystal material. In one type of liquid crystal device both the substrates and their associated electrodes are transparent to permit light to pass through the entire structure when the elongated molecules of the liquid crystal material are in one orientation, or to be opaque to light for another orientation of the liquid crystal molecules. In another type of liquid crystal device only one substrate and its associated electrode are transparent. In this type of device, light passes through the substrate and is reflected off the liquid crystal material for one state of the liquid crystal material. For another state of the liquid crystal material, light passes through the liquid crystal material and is reflected from the other substrate. For both types of devices images are formed by voltage biasing the control electrodes of selected cells to change the light transmission capabilities of the energized cells.

In both types of liquid crystal devices the molecules of the liquid crystal material are elongated and must be properly aligned with the surfaces of the substrates in order to assure uniformity of operation and high contrast of the displayed information. The required alignment of the liquid crystal molecules is achieved by coating the surfaces of the electrodes with an alignment material and rubbing the alignment material in the direction desired for the alignment of the molecules.

In active matrix liquid crystal display devices a switching device, such as a thin film transistor (TFT) or a solid state diode, is associated with each of the liquid crystal elements within the display. The alignment layer for active matrix liquid crystal devices must control three properties to provide optimum operation and contrast. The properties are the tilt angle between the principal axis of the molecules and the substrate, molecular alignment (parallel orientation of the liquid crystal molecules), and a high RC time constant. The tilt angle should be between 1° and 5° to provide a suitable response time and to optimize the viewability of the device. Good molecular alignment of the liquid crystal molecules is necessary to provide uniformity of operation and high contrast between the energized and deenergized states. Because a high RC time constant is needed the resistivity of the liquid crystal material must be sufficiently high to assure that the liquid crystal cells are capable of storing a charge for a time period of sufficient duration to display the desired image.

In directly driven liquid crystal devices, i.e. those which do not employ solid state switching devices, the alignment layer must control only the tilt angle and the alignment of the liquid crystal molecules. The time constant, or resistivity, of the liquid crystal material is of no concern, because the crystal cells are not called upon to store a charge during the display of information. Accordingly, the alignment layer for directly driven display devices frequently is polyimide. The polyimide provides excellent molecular alignment and a desirable tilt angle within the range of 1.5° to 3°. The liquid crystal resistivity degrades at 90° C. Initially, the time constant of a cell having a polyimide alignment layer is 30 to 100 msec. Upon exposure to elevated temperatures the time constant degrades to 10 to 30 msec. A time constant of this duration is unacceptable for active matrix liquid crystal displays. Also, polyimide alignment material frequently degrades the resistivity of commonly used liquid crystal materials and, therefore, is unsuitable as an alignment layer in active matrix liquid crystal devices. Other materials, which do not adversely affect the resistivity of the liquid crystal material, typically demonstrate either poor molecular alignment or inadequate tilt angle and, therefore, also are not useful as alignment materials for active matrix liquid crystal devices. Evaporated $SiO_2$ has been tried but cannot be rubbed and therefore is not suitable as an alignment layer. Alignment can be obtained using angle evaporated $SiO_2$. However, angle evaporated $SiO_2$ methods are not easily repeatable and therefore are not suitable for use as an alignment material because the tilt angle is difficult to control.

For these reasons there is a need for an alignment layer for active matrix liquid crystal devices which provides acceptable tilt angle, good alignment of the liquid crystal molecules and a RC time constant suitable for use with active matrix liquid crystal devices. The present invention fulfills these needs.

CROSS REFERENCE TO RELATED APPLICATIONS

U.S. application Ser. No. 428,693 filed on even date herewith by G. Kaganowicz, F.P. Cumo, and L.J. Vieland, entitled "Alignment Layer For Liquid Crystal Devices And Method of Forming" describes technology related to that described herein.

U.S. application Ser. No. 428,696 filed on even date herewith by G. Kaganowicz and J.W. Robinson, entitled "Method of Making Liquid Crystal Devices With Improved Time Constant" describes technology related to that described herein.

U.S application Ser. No. 428,694 filed on even date herewith by G. Kaganowicz and J.W. Robinson entitled "Method Of Making Liquid Crystal Devices With Improved Adherence" describes technology related to that described herein.

The teachings of these applications are incorporated herein by reference.

SUMMARY

A liquid crystal device having a liquid crystal material disposed between first and second substrates and electrical electrodes arranged on the surfaces of the substrates adjacent to the liquid crystal material has an improved alignment layer comprising a plasma deposited layer of a porous inorganic, silicon based material on the electrodes.

BRIEF DESCRIPTION OF THE DRAWINGS

The FIGURE is a simplified cross section of a preferred embodiment.

DETAILED DESCRIPTION

In the FIGURE, a liquid crystal device 10 includes a liquid crystal material 11 disposed between two transparent insulative substrates 12 and 13. A transparent electrode 14 is disposed on the surface of the substrate 13 which faces the liquid crystal material 11. Any solid state switching devices, such as TFT's (thin film transistors) or MIM's (metal-insulator-metal diodes) which are required for an active matrix display device are not shown. However, the space needed for the solid state switching devices typically is provided by omitting a small corner of the electrode 14, and fabricating the solid state switching device in the space thus provided using solid state manufacturing techniques, which are known to those skilled in the art. A transparent electrode 15 is provided on the surface of the substrate 12 which faces the liquid crystal material 11. An alignment layer 16, which provides good molecular alignment, optimum resistivity and good tilt angle, is deposited over the transparent electrode 14. Similarly, an alignment layer 17, which also provides good molecular alignment, optimum resistivity and good tilt angle, is deposited over the transparent electrode 15 of the substrate 12.

The alignment layers 16 and 17 are applied to the transparent conductive electrode 14 and 15 utilizing glow discharge (plasma deposition) processes, which are well known in the art. The use of glow discharge processes to deposit silicon based inorganic materials onto the electrodes of the substrates yields alignment layers which have the required tilt angle, molecular alignment and high RC time constant. Inorganic materials have not heretofore been used as alignment layers because they can not be rubbed and, thus acceptable molecular alignment could not be obtained. By using glow discharge techniques the deposited materials used in the preferred embodiments are porous and can be rubbed and the needed molecular alignment is achieved. A very significant advantage is the high RC time constant which actually increases upon exposure to higher temperatures and high relative humidity. These advantages are evident from the examples and table below.

EXAMPLE 1

Liquid crystal cell substrates having an electrode on one surface were placed into a glow discharge system on a plate 1" away from the electrode. The system was evacuated to $10^{-5}$ torr and 45 sccm of ammonia and 30 sccm of silane were introduced into the system at a pressure of $50\mu$, power of 400 W at 13.56 MHz, was applied for 60 sec. to form a silicon nitride coating about 400Å thick on the electrodes. The silicon nitride coating $SiN_xH_y$, where $x=1.2$ and 0.5 y has all the properties needed for an effective alignment layer.

EXAMPLE 2

Liquid crystal cells were placed in a glow discharge system on a plate 1" away from the electrode.

After the system was evacuated to $10^{-5}$ torr 45 sccm of ammonia, 30 sccm of silene, and 60 sccm of nitrous oxide were introduced into the system. The pressure was controlled at $80\mu$. Power of 400 W at 13.56 MHz was applied to electrodes for 60 sec. to form a silicon oxynitride coating about 400Å thick on the electrodes.

Substrates from both examples were processed into liquid crystal cells and the time constants were measured as made and after exposure to 90° C. temperature and 90% RH. The results are summarized in the table below.

| Temperature And Humidity Exposure | RC Time Constant (Milliseconds) | |
|---|---|---|
| | Silicon Nitride Example 1 | Silicon Oxynitride Example 2 |
| As made | 175 | 165 |
| after ½ hour in 110° C. 90% RH | 190 | 127 |
| after 24 hours at 90° C. 90% RH | 190 | 245 |
| after 1 week at 90° C. 90% RH | 280 | 279 |
| after 4 weeks at 90° C. 90% RH | 260 | 294 |

EXAMPLE 3

Liquid crystal cell substrates having electrodes on one surface were placed in a glow discharge system on a plate 1" away from the electrode. The system was evacuated to $10^{-5}$ torr and 170 sccm of $N_2O$ and 5 sccm of $SiH_4$ were introduced into the system. The pressure was controlled at $45\mu$. Power of 400 W at 13.56 MHz was applied for 3 minutes to form a coating approximately 350Å thick. The substrates were rubbed and assembled into a cell. Preferably, the deposition is done at room temperature.

The alignment was fully acceptable and the time constant was measured and found to be above 1 sec. The time constant remained above 1 second after four weeks storage at 90° C. and 90% relative humidity. The ability to achieve the desired alignment by rubbing $SiO_2$ is an unexpected result because $SiO_2$ deposited by evaporation techniques can not be rubbed and this prevented the use of $SiO_2$ as an alignment layer despite the excellence of its tilt angle and resistivity characteristics.

What is claimed is:

1. In a liquid crystal device having a liquid crystal material disposed between first and second substrates and electrical electrodes arranged on the surfaces of said substrates adjacent to said liquid crystal material, an improved alignment layer comprising:
    a glow discharge deposited layer of a porous inorganic, silicon based dielectric material on said electrodes.

2. The alignment layer of claim 1 wherein said inorganic material is selected from the group consisting of silicon nitride, silicon oxynitride and silicon oxide.

3. The alignment layer of claim 1 wherein said alignment layer comprises $SiN_xH_y$ where:
    $x=1.2$, $y=0.5$.

4. A method of forming an alignment layer on the electrodes of a liquid crystal display device comprising the steps of:
    glow discharge depositing a layer of an inorganic, porous, silicon based material onto said electrodes; and
    rubbing said alignment layer in the direction of desired molecular alignment.

5. The method of claim 4 wherein said inorganic material is selected from the group consisting of silicon nitride, silicon oxynitride and silicon oxide.

6. The method of claim 4 wherein said alignment layer comprises $SiN_xH_y$ where:
    $x=1.2$, $y=0.5$.

* * * * *